Figure 1:
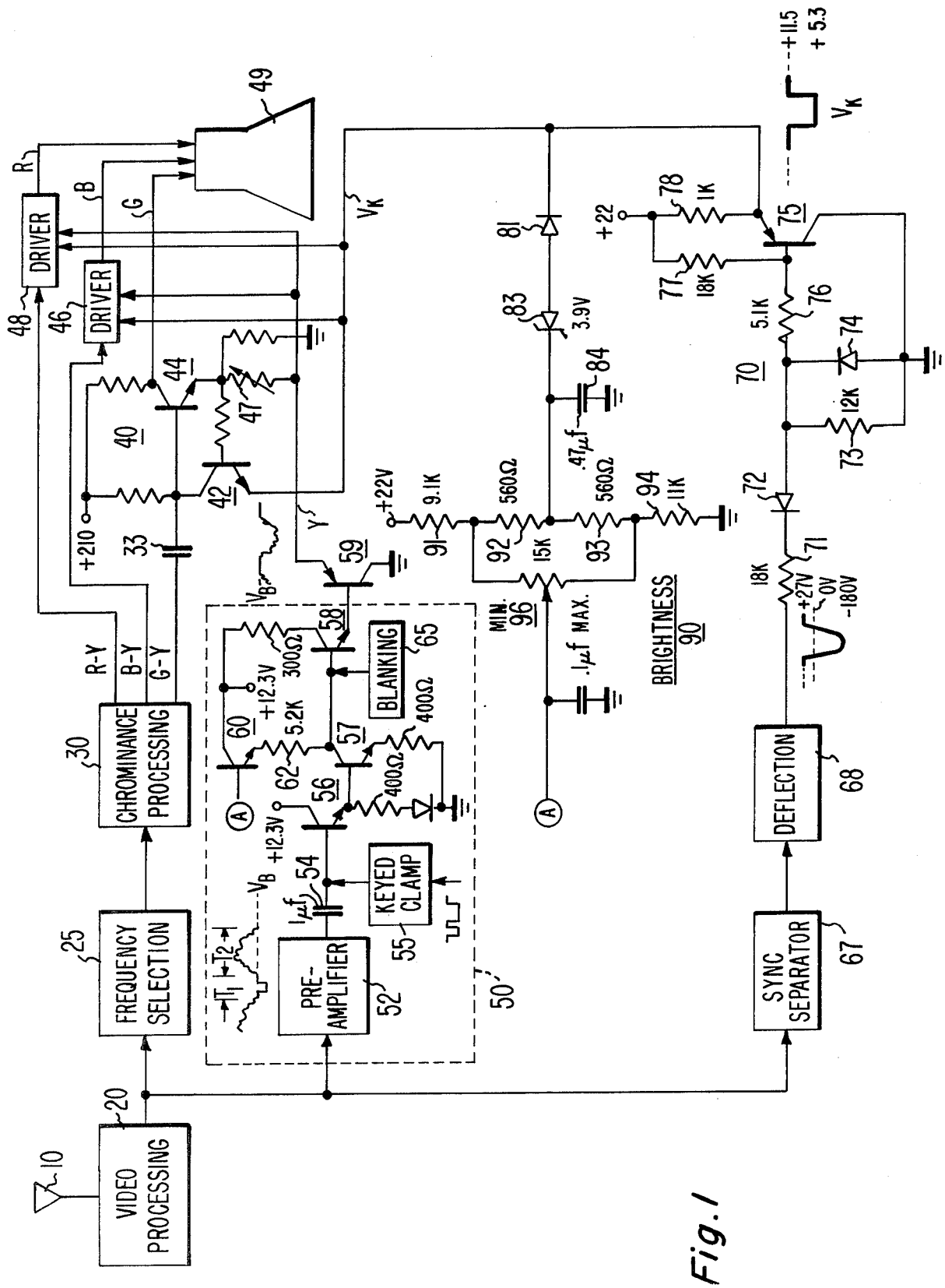

United States Patent [19]

Shanley, II

[11] 4,135,200

[45] Jan. 16, 1979

[54] BRIGHTNESS CONTROL CIRCUIT WITH PREDICTABLE BRIGHTNESS CONTROL RANGE

[75] Inventor: Robert L. Shanley, II, Indianapolis, Ind.

[73] Assignee: RCA Corporation, New York, N.Y.

[21] Appl. No.: 796,340

[22] Filed: May 12, 1977

[51] Int. Cl.$^2$ ............................................. H04N 5/68
[52] U.S. Cl. ..................................... 358/21; 358/168; 358/39
[58] Field of Search ................... 358/21, 34, 168, 243, 358/39, 40

[56] References Cited

U.S. PATENT DOCUMENTS 3,502,807 3/1970 Anderson ............................ 358/168

Primary Examiner—Robert L. Richardson

Attorney, Agent, or Firm—Eugene M. Whitacre; William H. Meagher; Ronald H. Kurdyla

[57] ABSTRACT

An image brightness control arrangement for a color video signal processing system including a plurality of amplifiers each responsive to luminance and separate color difference signals for developing color representative output signals. A brightness control (e.g., a potentiometer) also is included for varying a brightness determinative D.C. level of the luminance signal. A locally generated periodic keying signal, occurring during periodic image blanking intervals of the video signal and of a magnitude which may vary undesirably, is coupled to each of the amplifiers for establishing a reference level for the color difference signals, as described in U.S. Pat. No. 3,970,895. A derived signal indicative of the magnitude of the keying signal is coupled to the brightness control for establishing a brightness control range thereof.

16 Claims, 4 Drawing Figures

BRIGHTNESS CONTROL CIRCUIT WITH PREDICTABLE BRIGHTNESS CONTROL RANGE

This invention relates to brightness control apparatus for video signal processing systems and, more particularly, to such apparatus operatively associated with keyed clamping video signal processing circuits of a television receiver for providing a predictable range of brightness control.

Because of the nature of a composite television signal in which a reference blanking level occurs periodically, so-called keyed clamps are often employed in television receivers to conduct during intervals associated with the reference level and thereby charge a coupling capacitor so as to restore or provide a reference D.C. component to a signal coupled by the capacitor. A keyed clamping arrangement can be advantageously employed in a kinescope driver stage for stabilizing the operating point and for establishing the blanking cut-off level of the driver stage. An arrangement of this type is described in U.S. Pat. No. 3,970,895 granted to D. H. Willis and in my U.S. Pat. No. 3,959,811, both assigned to the same assignee as the present invention.

The present invention concerns a brightness control arrangement suitable for use with a video signal processing system of the type described in the aforementioned U.S. patent of Willis.

In the design of a brightness control circuit for a television receiver, it is desirable to provide a predictable range of brightness variation. The brightness control circuit commonly includes a viewer adjustable potentiometer, for example, coupled to a kinescope of the receiver either directly or through suitable signal processing circuits. Where a number of circuit elements and voltage sources are direct current coupled to the kinescope, variations of the values of the circuit elements and supplies must be taken into account in determining the operating range of the brightness control circuit. In a system employing a kinescope driver stage operatively associated with a keyed clamp of the type disclosed in the aforementioned Willis patent, variations of the level of the keying signal can cause the clamped D.C. bias of the kinescope driver stage to shift undesirably. A corresponding unwanted shift in the brightness of a reproduced image also results.

Such variations can be accounted for by providing the brightness control with an operating range greater than that which would otherwise be required. This can be accomplished, for example, by coupling the brightness control (i.e., potentiometer) across a relatively large voltage supply. In such a case, only a small portion of the operating range is used for purposes of brightness control. The sensitivity of such a control typically is limited because of the small brightness control range. Fine adjustment of image brightness can be difficult when the useful brightness control range corresponds to a relatively small percentage of the overall, relatively greater operating range of the control. Also, a nominal mid-range setting of the brightness control, corresponding to a predetermined "black level" about which it is desired to vary image brightness, can shift from receiver to receiver due to such variations.

The brightness control arrangement to be described, in a keyed clamping video driver system or similar such system, provides accurate and predictable operation wherein the range of controllable brightness variation provided by the viewer operated brightness control is readily determined for various operating conditions. One type of such an arrangement is disclosed in a co-pending U.S. patent application Ser. No. 715,851, entitled "Brightness Control Apparatus" of M. N. Norman, filed Aug. 18, 1976 and assigned to the same assignee as the present invention. In particular, the arrangement to be described is operatively associated with the keying signal to achieve a reproducible range of brightness control.

In accordance with the present invention, brightness control apparatus is provided in a system for processing a composite color video signal including chrominance and luminance components. Th luminance component comprises periodically recurring image blanking intervals disposed between adjacent image intervals, and a D.C. level determinative of image brightness. A color representative output signal is produced by a signal translating circuit in response to the chrominance and luminance components. Locally generated keying signals occurring during the blanking intervals, and having a magnitude which may vary undesirably, are coupled to the signal translating circuit for establishing a reference level for the chrominance component. A derived signal indicative of the magnitude of the keying signal is coupled to an image brightness control network which is employed to control the D.C. level of the luminance component.

Figure 2:
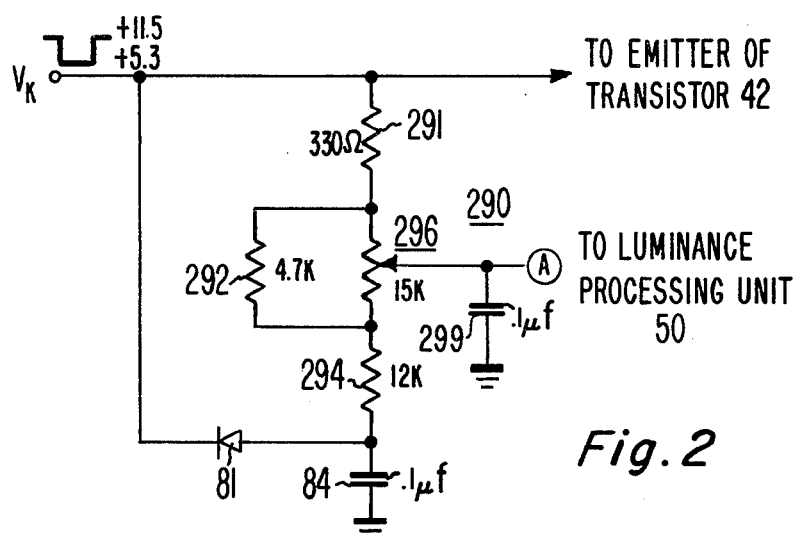
Figure 3:
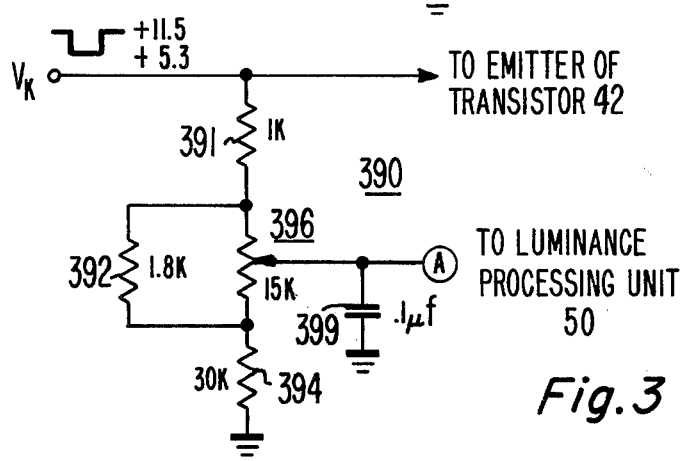
Figure 4:
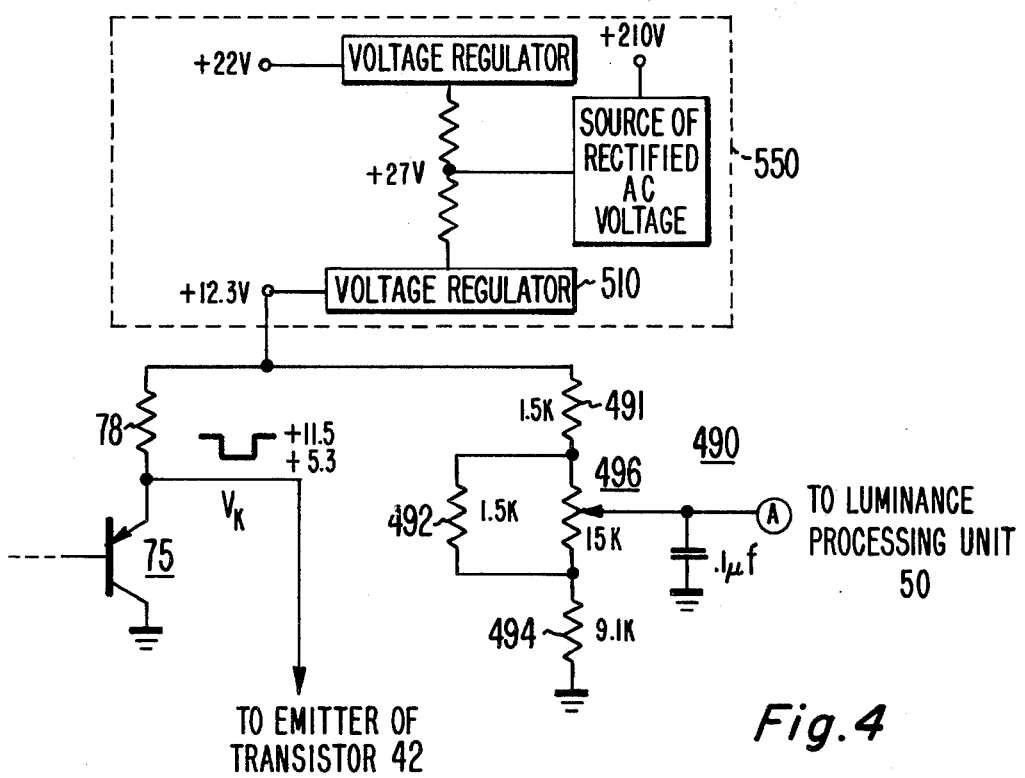

In the drawing:

FIG. 1 shows, partially in block diagram form and partially in schematic circuit diagram form, a general arrangement of a color television receiver employing a brightness control circuit constructed in accordance with the present invention; and FIGS. 2–4 show alternate circuit embodiments of the brightness control circuit shown in FIG. 1.

Referring to FIG. 1, a video signal processing unit 20 receives radio frequency signals from an antenna 10 and translates these signals through intermediate frequency amplifying and detecting stages (not shown) to provide a composite video signal. The composite video signal comprises chrominance, luminance, sound and image synchronizing components.

The chrominance component of the composite video signal is selectively coupled via a frequency selection unit 25 to a chrominance signal processing unit 30 included in a chrominance channel of the receiver, for deriving R-Y, B-Y and G-Y color difference signals. The color difference signals are respectively coupled to kinescope driver stages 40, 46 and 48. Driver stage 40 comprises a signal amplifier transistor 44 and a keying clamping transistor 42 operatively associated with a capacitor 33 through which the G-Y color difference signal is coupled to transistor 44, all arranged as shown. Driver stages 46 and 48 are arranged and operate in the same manner as stage 40, as disclosed in U.S. Pat. No. 3,970,895. The driver stages combine an amplified luminance signal, Y, with the respective R-Y, B-Y and G-Y color difference signals to form R, B and G color signals. The R, B and G color signals are applied to control electrodes (e.g., cathodes) of a kinescope 49.

A luminance channel of the receiver comprises a luminance signal processor 50 and a PNP luminance signal driver amplifier transistor 59. The luminance component is preamplified and otherwise translated by a preamplifier 52 of unit 50, for providing a "sync tip negative" luminance signal at an output. The luminance signal includes a periodic image interval $T_2$ (approximately fifty-one microseconds) and a periodic blanking interval $T_1$ (approximately twelve microseconds) disposed between adjacent image intervals. The blanking interval includes a negative-going sync pulse superimposed on a pedestal blanking level $V_B$. The preamplified luminance signal is clamped to a reference level during so-called front and back porch portions of the blanking interval by a clamping network including a coupling capacitor 54 and a keyed clamp 55 of conventional type. The clamp luminance signal is coupled to transistor 59 via a signal translating network including transistors 56, 57 and 58. Not shown is a resistor coupled between an emitter of transistor 56 and a junction point to which a base of transistor 57 is coupled, and a current source coupled to an emitter of transistor 58. Periodic blanking pulses from a source 65 inhibit conduction of the luminance signal through transistor 58 during horizontal and vertical image blanking (retrace) intervals. Transistor 59 is non-conductive at this time. With the exception of capacitor 54, the elements of processor 50 can be formed on a single monolithic integrated circuit.

An amplified luminance signal Y is coupled from transistor 59 to driver stage 40 via a pre-set variable drive control resistor 47, and in like manner to driver stages 46 and 48.

A sync separator 67 derives periodic image synchronizing (sync) signals from the composite video signal, and supplies the sync signals to a deflection unit 68. Deflection unit 68 develops periodic, negative horizontal flyback pulses in response to the sync signals. The horizontal flyback pulses occur during horizontal image line retrace (i.e., blanking) intervals of each line scanning cycle, and are coupled to a keying pulse generator circuit 70.

Keying circuit 70 includes a series resistor 71 and diode 72, a parallel coupled resistor 73 and diode 74, resistors 76, 77, 78 and a PNP transistor 75 all arranged as shown. Diodes 72, 74 and transistor 75 conduct in response to the negative-going flyback pulse to provide a periodic keying pulse $V_K$, in phase with and substantially coincident with the flyback pulse, from an emitter output of transistor 75 during each retrace blanking interval. The lower amplitude level of pulse $V_K$ (+5.3 volts) corresponds to a keying level of the keying pulse. The operation of a keying circuit of the type of circuit 70 is discussed in detail in U.S. Pat. No. 3,984,864 of D. H. Willis, assigned to the same assignee as the present invention.

The keying pulse is coupled to an emitter of clamp transistor 42 of driver stage 40 for controlling the conduction of transistor 42 during the blanking interval, as will be discussed. The keying pulse is also coupled to a keyed clamp transistor (not shown) in each of driver stages 46 and 48 in similar fashion for the same purpose.

Keying pulses from transistor 75 are also coupled to a (negative) peak detector circuit including an amplitude detector diode 81, a level shifting zener diode 83, and a capacitor 84 for storing a charge representative of the detected keying level of the signal coupled via diodes 81 and 83.

A voltage developed across capacitor 84 is applied to a resistive brightness control network 90, including series resistors 91–94 coupled between a regulated source of potential (+22 volts) and a point of reference potential (ground), and a viewer operated brightness control potentiometer 96 coupled across equal value resistors 92 and 93. A brightness control voltage appearing on a wiper of potentiometer 96 is coupled via circuit point A to an emitter follower transistor 60 and a resistor 62 to a collector output of transistor 57 of luminance processor 50, for altering the D.C. component of the clamped luminance signal in accordance with the setting of the wiper. The D.C. content of the luminance signals is determinative of image brightness, so that adjustment of the D.C. content of the clamped luminance signal in accordance with the setting of potentiometer 96 serves to adjust the brightness of a reproduced image between minimum (MIN) and maximum (MAX) brightness levels.

The operation of the brightness control circuit 90 will now be considered together with kinescope driver stage 40 as a representative one of the kinescope driver stages.

The combination of complementary transistors 59 and 44 serves to amplify and matrix the Y and G-Y signals to derive the G signal at a collector output of amplifier transistor 44. As described in greater detail in U.S. Pat. No. 3,970,895, amplifier transistor 44 and keyed clamp transistor 42 are arranged in feedback relation, and the voltage developed at the emitter of transistor 44 during horizontal retrace is maintained substantially independent of the D.C. conditions of chrominance unit 30 and the base-emitter voltage variations of transistor 44 by the clamping network comprising coupling capacitor 33 and keyed transistor 42. Clamping network 33, 42 also serves to establish the blanking conduction level of amplifier transistor 44 and therefore that of kinescope driver stage 40 for purposes of biasing kinescope 49. Clamping action occurs when keyed transistor 42 conducts in response to the keying level of signal $V_K$ during the horizontal flyback blanking interval, when the keying level appears at the emitter of transistor 42. A reference voltage related to the keying level then appears at the junction of coupling capacitor 33, the collector of transistor 42, and the base input of amplifier transistor 44. The reference voltage serves to establish a desired direct voltage component of the color difference signal amplified by transistor 44 and coupled to the kinescope 49.

The keying level applied to transistor 42 during the blanking interval establishes a reference bias voltage for driver stage 40 representative of a desired black level condition (i.e., the kinescope is at threshold conduction and the voltages appearing at the emitters of transistors 44 and 59 are such that substantially no current flows in resistor 47). Since signal image information is absent during the blanking interval, a voltage then appearing at the emitter of luminance amplifier transistor 59 should be such that the desired black level condition is preserved.

The emitter voltage of transistor 59 is a function of the setting of brightness potentiometer 96. Preferably, the desired black level condition should correspond predictably to a given setting of potentiometer 96 (e.g., at or near mid-range) from receiver to receiver. In such case, the brightness of a reproduced image can be varied in substantially equal amounts (e.g., symmetrically) with respect to the nominal black level design condition, in accordance with a particular viewer's preference.

The desired black level condition can vary unpredictably from receiver to receiver. For example, the keying level of keying signal $V_K$ can vary unpredictably due to variations in the values of associated circuit elements due to tolerances and temperature changes, thereby upsetting the reference bias voltage established for driver stage 40. The desired black level condition is correspondingly upset.

The manner in which the keying pulses are also coupled to the resistive network of brightness control 90 serves to provide a predictable brightness control range and the desired black level condition which, in this case, corresponds to a setting of potentiometer 96 at approximately mid-range. In essence, this is accomplished by developing voltages at the wiper of brightness potentiometer 96 and at the emitter of transistor 42 which track predictably with each other in the presence of variations of the keying level of signal $V_K$. That is, the difference between these voltages will be substantially constant from receiver to receiver for a particular setting of brightness potentiometer 96.

The peak detector including diodes 81, 83 and capacitor 84 responds to the keying level to develop a substantially D.C. potential on capacitor 84 representative of the keying level. This potential tracks closely with variations of the keying level and is applied to the junction of resistors 92 and 93 of brightness control circuit 90 to assist in establishing a desired range of brightness control voltage in conjunction with voltage divider resistors 91–94, potentiometer 96 and the source of operating potential (+22 volts) associated with network 90. The brightness control voltage developed across potentiometer 96 (+10.5 volts at MIN, and +9.3 volts at MAX) corresponds to the voltage developed across series resistors 92 and 93.

Detector diode 81 conducts in response to the keying level. The keying level transmitted via diode 81 is then shifted to a more positive D.C. potential via zener diode 83, in order to provide a desired voltage of approximately 9.8 volts across capacitor 84 and therefore at the junction of resistors 92 and 93. A resistance-capacitance discharge time constant associated with capacitor 84 is determined by the value of capacitor 84 and the effective resistance presented to capacitor 84 by the resistive elements of network 90. With the values shown, the discharge time constant is sufficiently long to permit the charge on capacitor 84, representative of the keying level, to remain on capacitor 84 for the duration of the horizontal trace interval. Additional charge supplied to capacitor 84 via the +22 volt source and resistors 91, 92 during this time is negligible.

Variations of the keying voltage level applied to clamp transistor 42 will track predictably with variations in the voltage developed at the wiper of brightness potentiometer 96 in response to the keying level. Thus, for a particular setting of potentiometer 96, the difference between the voltage appearing at the wiper of potentiometer 96 and the keying voltage at the emitter of clamp transistor 42 will be substantially constant in the presence of variations in the keying level. In this regard it is noted that the operating characteristics (e.g., bias point) of the network comprising transistor 59 and transistors 56, 57, 58 and 60 may vary (e.g., with temperature). This may cause the D.C. level of the D.C. coupled clamped luminance signal supplied from unit 50 to driver stage 40 to deviate slightly from a normally expected value, in this example. However, any such slight deviation is considered acceptable and does not alter the principles of the present invention. When the circuitry including transistors 56–58 and 60 of unit 50 are formed in a single integrated circuit, conventional design techniques can be employed to reduce such deviations to an acceptable minimum.

With the described arrangement, the voltages developed at the wiper of potentiometer 96 and at the emitters of transistors 42 and 44 of driver stage 40 exhibit a predictable relationship, so that the desired black level condition is substantially preserved notwithstanding variations in the keying level.

More specifically, undesired variations in the keying level do not adversely affect the operation of the color signal amplifier transistors of the driver stages (e.g., transistor 44 of driver stage 40). For example, such variations cause the clamped D.C. bias voltage from transistor 42, and the D.C. level of the clamped luminance signal (Y) supplied to amplifier transistor 44, to change in the same direction. As discussed, the D.C. level of the luminance signal for a particular setting of potentiometer 96 is responsive to the keying level and variations thereof. The voltage from transistor 42 in response to the keying level and the D.C. level of the clamped luminance signal tend to alter the conduction of transistor 44 in opposing directions, since they are applied to base and emitter electrodes of transistor 44, respectively. Variations of the keying level which would tend to upset the desired black level condition and image brightness are therefore substantially nullified.

The described arrangement also achieves a predictable range of brightness control which tracks with the bias supplied to kinescope 49 via transistor 44 in response to the clamping action of transistor 42, since both the kinescope bias and brightness control range are a function of the keying level. The clamped bias voltage provided by clamp transistor 42 and the voltage provided by network 90 both affect the D.C. content of the video signal supplied to kinescope 49 through amplifier transistor 44, and therefore both affect the brightness of a reproduced image. Since both voltages are a function of the keying level, variations of the keying level affect these voltages in substantially the same manner (i.e., they track closely). Therefore, a more precise and reproducible brightness control range of potentiometer 96 can be established substantially without a need to account for such variations by providing excess operating voltage range for brightness potentiometer 96.

The +22 volt source associated with brightness network 90 can be regulated or unregulated. In the latter case, variations in the value of the voltage source may cause the potential appearing across potentiometer 96, and therefore the overall available brightness control range, to vary slightly. However, the mid-range brightness control voltage will remain substantially unchanged, since this voltage is a function of the voltage developed on capacitor 84 in response to the keying level independent of the +22 volt source.

FIGS. 2–4 show alternate embodiments of brightness control networks in accordance with the present invention. The alternate embodiments are more economical compared to the brightness control arrangement of FIG. 1, and serve to minimize the adverse effects of variations of the magnitude of the keying signal upon image brightness.

In FIG. 2, the keying pulse $V_K$ is directly connected to one end of a network 290 including voltage divider resistors 291, 292, 294 and a brightness potentiometer 296, and to another end of the resistive divider via a peak detector including a detector diode 81 and a charge storage capacitor 84. The peak detector operates as discussed in connection with FIG. 1, to develop a voltage on capacitor 84 representative of the keying level. Thus, a voltage developed across network 290 and potentiometer 296 is a function of the time varying keying signal $V_K$ as applied to resistor 291, and the detected keying level as applied to the lower end of resistor 294. A capacitor 399 filters the alternating component of the keying signal, so that the voltage appearing on the wiper of potentiometer 296 tracks with the magnitude of the average value of the keying signal waveform as well as with the detected keying level developed across capacitor 84.

In some cases it may be desired to provide an appropriate brightness control voltage which tracks with the magnitude of the keying signal, without employing a peak detector (e.g., diode 81 and capacitor 84 in FIG. 2). Such a brightness control arrangement is shown in FIG. 3.

In FIG. 3, a brightness control network 390 includes voltage divider resistors 391, 392, 394 and a brightness potentiometer 396. The keying signal is coupled to network 390 and utilized as in FIG. 2. A capacitor 399 filters the alternating component of the keying signal, so that a voltage appearing on the wiper of potentiometer 396 tracks with the magnitude of the average value of the keying signal. In order to provide an appropriate brightness control voltage in this instance, the value of resistor 391 is chosen less than the value of resistor 394 plus the parallel combination of resistor 392 and potentiometer 396. If resistor 394 is relatively large, as in this example, the value of resistor 391 should be significantly less than the sum of the value of resistor 394 plus the value of the parallel combination of resistor 392 and potentiometer 396. Dimensioning the resistive elements of network 390 in this manner permits elimination of the keying level peak detector (e.g., resistor 81 and capacitor 84 in FIG. 2) while providing a brightness control voltage which tracks appropriately with the keying signal.

In the arrangement of FIG. 4, a brightness network 490 comprises voltage divider resistors 491, 492, 494 and a brightness potentiometer 496. Operating potential for network 490 is supplied from the same source which provides operating potential for transistor 75 of circuit 70, which generates the keying signal.

It has been observed that if the operating potentials for the brightness control network and for the circuit which generates the keying signals are supplied from independent sources (e.g., +12.3 volts and +22 volts), variations of the brightness control range from an expected range are primarily attributable to unrelated variations in the values of the independent sources, both within a given receiver and from receiver to receiver. In the arrangement of FIG. 4, therefore, the keying signal generator and brigtness control circuit share a common regulated +12.3 volt supply.

The +12.3 volt supply can be provided, for example, from a (zener) regulated supply 510 included in a multiple voltage supply 550. Source 550 also supplies an operating potential of +210 volts for the kinescope driver stages, and a regulated operating potential (+22 volts) for other circuits (not shown) associated with luminance processor 50. As a practical matter, the actual value of the +12.3 volt supply can vary from receiver to receiver due to circuit tolerances of regulator 510. The actual value of the supply also can vary within a given receiver and from receiver to receiver due to ambient temperature changes. In either case, supply variations undesirably affect the magnitude of the keying signal and the keying level. Since the keying signal establishes a reference D.C. bias for driver stage 40, variations in the keying signal adversely affects the D.C. level of the signal applied to kinescope 49, and thereby the brightness of a reproduced image. The normally expected range of brightness control (via potentiometer 496) is similarly affected.

Variations in image brightness due to such supply variations can be reduced when the keying circuit and brightness control network are supplied from a common operating voltage source. In such case, for a given setting of potentiometer 496, the brightness control wiper voltage at point A and the magnitude of the keying signal are interrelated and will track with each other in the presence of variations in the level of the common supply. The advantage of such a common supply arrangement becomes more pronounced if the common supply is unregulated as an economy measure, for example.

It will be appreciated that the arrangement of FIG. 4 does not compensate for brightness variations caused by other than variations in the level of the common supply (+12.3 volts) which affect the magnitude of the keying signal. Such other causes can include, for example, variations in the conduction of transistor 75 due to temperature changes. The arrangement of FIG. 4 nevertheless compensates for a significant cause of brightness variations (i.e., changes in the magnitude of the keying signal induced by operating supply changes) and reduces such variations to an acceptable minimum.

Although the invention has been described in terms of specific circuit arrangements, it should be recognized that other arrangements can be devised without departing from the scope of the invention. For example, the brightness control voltage appearing at point A can be coupled to each of driver stages 40, 46 and 48 directly, with proper polarity, rather than to luminance processor 50 as shown.

What is claimed is:

1. In a system including a signal channel for processing an image representative composite color video signal including a chrominance component, and a luminance component having periodically recurring image blanking intervals disposed between adjacent image intervals and containing a D.C. level determinative of image brightness; signal translating means responsive to said chrominance and luminance components for producing a color representative output signal containing said D.C. level, apparatus comprising:
   means for providing periodic keying signals occurring during said blanking intervals and of a magnitude which may vary undesirably;
   means coupled to said signal translating means and responsive to said keying signal for clamping said chrominance component to a reference level;
   image brightness control means coupled to said signal channel for controlling said D.C. level of said output signal;
   means for providing a voltage subject to variations correlated with undesired variations of said magnitude of said keying signal; and
   means for coupling said correlated voltage to said brightness control means.

2. Apparatus according to claim 1, wherein:
   said brightness control means comprises a voltage divider coupled between first and second potentials; and
   said correlated voltage is coupled to a point in said voltage divider.

3. Apparatus according to claim 2, wherein:

said voltage divider includes a potentiometer coupled between first and second points in said voltage divider; and said correlated voltage is coupled to a point intermediate to said first and second points.

4. Apparatus according to claim 2, wherein:

said keying signal is coupled to said voltage divider for providing one of said first and second potentials.

5. Apparatus according to claim 4, wherein:

said correlated voltage is coupled to said voltage divider for providing the other of said first and second potentials.

6. Apparatus according to claim 2, wherein:

said signal channel comprises a luminance channel including means for clamping said D.C. level of said luminance signal to a reference level; and said brightness control means is coupled to said luminance channel for controlling said D.C. level of said clamped luminance signal and thereby said D.C. level of said output signal.

7. Apparatus according to claim 6, wherein:

said chrominance component comprises a plurality of color difference signals;

said signal translating means comprises a plurality of amplifiers each responsive to said D.C. controlled, clamped luminance component coupled to a first input of each of said amplifiers, and to separate ones of said color difference signals coupled to respective second inputs of said amplifiers; and said clamping means comprises a plurality of controllable conduction devices each respectively coupled to individual ones of said amplifiers.

8. Apparatus according to claim 7, wherein:

each of said amplifiers comprises a transistor with a first emitter input, a second base input and a collector output; and each of said controllable conduction devices comprises a transistor arranged in feedback relation with respective ones of said amplifier transistors.

9. Apparatus according to claim 1, wherein:

said signal channel includes luminance and chrominance channels for processing said luminance and chrominance components, respectively; and said brightness control means is coupled to said luminance channel.

10. In a system including a signal channel for processing an image representative composite color video signal including a chrominance component, and a luminance component having periodically recurring image blanking intervals disposed between adjacent image intervals and containing a D.C. level determinative of image brightness; signal translating means responsive to said chrominance and luminance components for producing a color representative output signal containing said D.C. level, apparatus comprising:

means for providing periodic keying signals occurring during said blanking intervals and of a magnitude which may vary undesirably;

means coupled to said signal translating means and responsive to said keying signal for clamping said chrominance component to a reference level;

image brightness control means comprising a voltage divider coupled between first and second potentials and coupled to said signal channel for controlling said D.C. level of said output signal;

means for providing a voltage subject to variations correlated with undesired variations of said magnitude of said keying signal, said correlated voltage corresponding to a predetermined keying level of said keying signal and being coupled to a point in said voltage divider; and means for coupling said correlated voltage to said brightness control means.

11. Apparatus according to claim 10, wherein:

said correlated voltage providing means comprises a peak detector responsive to said keying level.

12. Apparatus according to claim 11, wherein:

said peak detector comprises an amplitude detector diode, and a charge storage device for developing a voltage representative of the magnitude of said keying level.

13. In a system including a signal channel for processing an image representative composite color video signal including a chrominance component, and a luminance component having periodically recurring image blanking intervals disposed between adjacent image intervals and containing a D.C. level determinative of image brightness; signal translating means responsive to said chrominance and luminance components for producing a color representative output signal containing said D.C. level, apparatus comprising:

means for providing periodic keying signals occurring during said blanking intervals and of a magnitude which may vary undesirably;

means coupled to said signal translating means and responsive to said keying signal for clamping said chrominance component to a reference level;

image brightness control means comprising a voltage divider coupled between first and second potentials and coupled to said signal channel for controlling said D.C. level of said output signal, said keying signal being coupled to said voltage divider for providing one of said first and second potentials;

means for providing a voltage subject to variations correlated with undesired variations of said magnitude of said keying signal, said correlated voltage corresponding to a predetermined keying level of said keying signal and being coupled to said voltage divider for providing the other of said first and second potentials; and means for coupling said correlated voltage to said brightness control means.

14. In a system including a signal channel for processing an image representative composite color video signal including a chrominance component, and a luminance component having periodically recurring image blanking intervals disposed between adjacent image intervals and containing a D.C. level determinative of image brightness; signal translating means responsive to said chrominance and luminance components for producing a color representative output signal containing said D.C. level; a source of periodic pulses occurring during said blanking intervals; and a source of multiple operating supplies, a first operating voltage for said signal translating means being derived from one of said operating supplies; apparatus comprising:

means for providing periodic keying signals occurring during said blanking intervals and of a magnitude which may vary undesirably, said keying means comprising an active device having an input circuit coupled to said source of pulses and an output circuit coupled to a second operating voltage derived from another of said operating supplies, said keying signal being provided from said output circuit and said magnitude of said keying signal being a function of said second operating voltage which may vary undesirably;

means coupled to said signal translating means and responsive to said keying signal for clamping said chrominance component to a reference level;

image brightness control means coupled to said signal channel for controlling said D.C. level of said output signal;

means for providing a voltage subject to variations correlated with undesired variations of said magnitude of said keying signal; and means for coupling said second operating voltage to said brightness control means for providing an operating voltage therefor.

15. Apparatus according to claim 14, wherein:

said brightness control means comprises a voltage divider including a potentiometer coupled between said second operating voltage and a reference potential.

16. In a system including a signal channel for processing an image representative composite color video signal including a chrominance component, and a luminance component having periodically recurring image blanking intervals disposed between adjacent image intervals and containing a D.C. level determinative of image brightness; a source of multiple operating supplies; a color image reproducing device; and amplifier means with an operating potential derived from one of said operating supplies, for coupling said chrominance and luminance components to said image reproducing device; apparatus comprising:

keying means with an operating potential derived from another of said operating supplies, for providing periodic keying signals occurring during said blanking intervals and of a magnitude which may vary undesirably in response to variations in the magnitude of said other operating supply;

means coupled to said amplifier means and responsive to said keying signals for clamping said chrominance component to a reference level;

image brightness control means coupled to said signal channel for controlling said D.C. level of said luminance component; and means for coupling said other operating supply to said brightness control means for providing an operating voltage supply therefor.

* * * * *